US008194376B2

(12) United States Patent
Salazar

(10) Patent No.: US 8,194,376 B2

(45) Date of Patent: Jun. 5, 2012

(54) ENERGY STORAGE DISCHARGE CIRCUITRY

(75) Inventor: Octavio Salazar, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 425 days.

(21) Appl. No.: 12/400,167

(22) Filed: Mar. 9, 2009

(65) Prior Publication Data

US 2010/0226054 A1 Sep. 9, 2010

(51) Int. Cl.
*H02H 3/24* (2006.01)

(52) U.S. Cl. ........................................................ 361/92

(58) Field of Classification Search .................... 361/92; 347/44

See application file for complete search history.

(56) References Cited

U.S. PATENT DOCUMENTS 6,199,969 B1 * 3/2001 Haflinger et al. ............... 347/19
6,204,671 B1 * 3/2001 Katsuma ........................ 324/678
6,390,596 B1 * 5/2002 Jeon ................................ 347/37

* cited by examiner

*Primary Examiner* — Rexford Barnie
*Assistant Examiner* — Tien Mai
(74) *Attorney, Agent, or Firm* — Scott Gallert

(57) ABSTRACT

Storage device discharge means and methods are provided. Printer circuitry detects one or more anomalous operating conditions and asserts a switch, shunting storage capacitors to ground potential through a resistive load. Discharge of the storage capacitors protects inkjet firing resistors against damage that could otherwise result from the uncontrolled application of stored electrical energy.

12 Claims, 8 Drawing Sheets

ENERGY STORAGE DISCHARGE CIRCUITRY

BACKGROUND

Thermal inkjet printing uses a multitude of individually controlled firing resistors to eject droplets of ink onto media. Typically, significant voltage is applied to each firing resistor in the form of carefully controlled pulses in order to perform a normal printing process. Energy storage devices such as capacitors commonly serve to buffer the electrical energy used to power the firing resistors in a controlled manner.

However, a drop in voltage within a printer's circuitry can result in a loss of normal control. Such a loss of control can result in the unregulated delivery of the energy stored within the capacitors, further resulting in damage to and/or permanent destruction of some or all of the firing resistors.

Accordingly, the embodiments described hereinafter were developed in the interest of addressing the foregoing problems.

BRIEF DESCRIPTION OF THE DRAWINGS

The present embodiments will now be described, by way of example, with reference to the accompanying drawings, in which.

DETAILED DESCRIPTION

Introduction

Means and methods for discharging electrical storage devices within a printer are provided by the present teachings. Storage capacitors buffer high-voltage electrical energy that is used to power inkjet firing resistors in a controlled manner. Circuitry detects a sag in the high-voltage output, which can precede a loss of control of the stored energy. In the alternative, a signal is provided in response to another anomalous operating condition. In response, a shunt switch is electrically closed so as to discharge the storage capacitors a resistive load. This preemptive discharge operation serves to protect the firing resistors against damage that can otherwise occur. Once the high-voltage drop or anomalous condition is resolved, the discharge operation is ended and normal printing can resume.

In one embodiment, an apparatus includes supervisor circuitry configured to monitor a voltage and to provide a signal in response to detecting a drop in the voltage below a threshold value. The apparatus also includes shunt circuitry that is configured to electrically discharge one or more energy storage devices in accordance with the signal. The one or more energy storage devices are configured to buffer electrical energy used within an inkjet printer.

In another embodiment, a printing apparatus includes at least one ink jetting device. The printing apparatus also includes drive circuitry that is configured to control operation of the at least one ink jetting device. The drive circuitry includes one or more energy storage devices. The printing apparatus also includes protective circuitry that is coupled to the drive circuitry. The protective circuitry is configured to electrically discharge the one or more energy storage devices in response to a drop in a monitored voltage below a threshold value.

In yet another embodiment, a method includes detecting a drop in a monitored voltage below a threshold. The monitored voltage is used to drive one or more ink jetting devices of a printer device. The method also includes discharging one or more energy storage devices in response to the detecting the drop in the monitored voltage.

First Illustrative Embodiment

Figure 1:
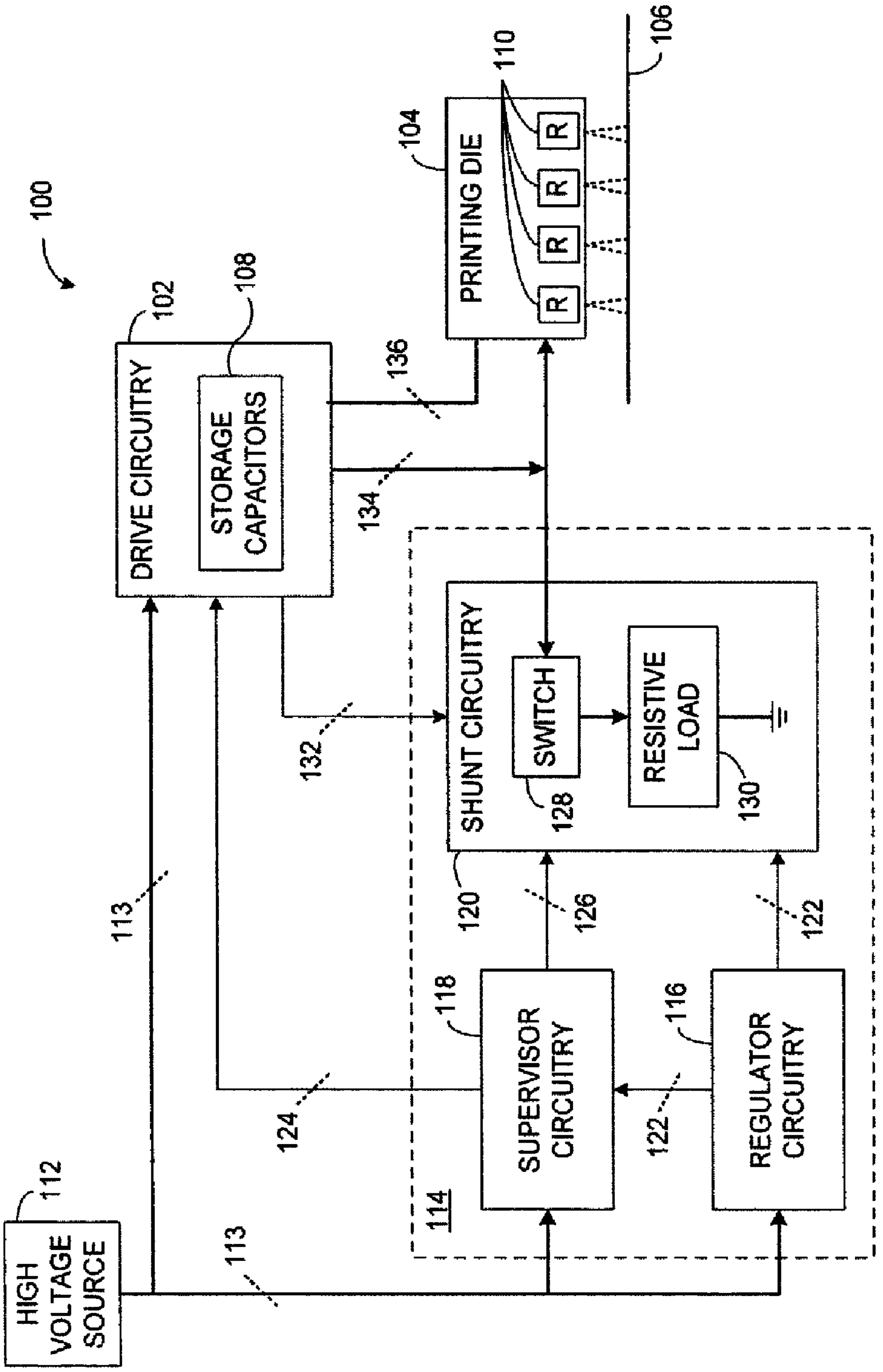
FIG. 1 depicts a block diagrammatic view of a printing apparatus according to one embodiment.

FIG. 1 depicts a block diagrammatic view of a printing apparatus (printer) 100 according to one embodiment. The printer 100 is illustrative and non-limiting in nature. Thus, other printers can be defined, configured and used in accordance with the present teachings.

The printer 100 includes drive circuitry 102. The drive circuitry 102 is configured to control numerous, normal operations of the printer 100. In particular, the drive circuitry 102 is configured to control the jetting of liquid ink from one or more printing dies 104 onto media (e.g., paper, etc.) 106. The printing dies 104 include a plurality of firing resistors that power the ejection of ink droplets by way of rapid vaporization of the ink. Only one printing die 104, including four firing resistors 110, is shown in the interest of simplicity. However, it is to be understood that the present teachings can be applied to any practical number of printing dies 104 respectively inclusive of any number of firing resistors 110.

The drive circuitry 102 includes one or more storage capacitors (i.e., energy storage devices) 108. The capacitors 108 are configured to buffer—that is, store and filter—electrical energy that is used to power the plurality of firing resistors 110 of the one or more printing dies 104. During normal printing operations, electrical energy stored within the storage capacitors 108 is coupled to the firing resistors 110 in a precise, individually controlled manner.

The printer 100 also includes a (relatively) high-voltage source 112. In one embodiment, the high-voltage source 112 provides an output 113 of direct-current (D.C.) electrical energy of about thirty-two volts potential. Other voltages corresponding to other embodiments can also be used. The high-voltage source 112 provides electrical potential 113 that is buffered in the one or more storage capacitors 108 for use in energizing the firing resistors 110.

The printer 100 further includes protective circuitry 114. The protective circuitry 114 includes regulator circuitry 116, supervisor circuitry 118 and shunt circuitry 120. The protective circuitry 114 is configured to protect the firing resistors 110 against damage and/or destruction that can occur when the electrical energy stored within the storage capacitors 108 is applied to the firing resistors 110 in an uncontrolled manner. Such an uncontrolled application event can occur, for example, during a loss or dip in distributed (i.e., local utility) power.

The regulator circuitry 116 is configured to provide (relatively) low-voltage electrical energy 122 to the balance of the protective circuitry 114. In one embodiment, the regulator circuitry 116 provides D.C. electrical energy of about five volts potential. Other voltages corresponding to other embodiments can also be used. The regulator circuitry 116 is configured to derive this low-voltage output 122 from the output 113 of the high-voltage source 112. The regulator circuitry 116 is further configured to operate normally even when the output 113 from the high-voltage source 112 has dropped significantly.

The supervisor circuitry 118 is configured to monitor the output 113 of the high-voltage source 112. The supervisor circuitry 118 is also configured to assert a signal 124 provided to the drive circuitry 102, and to assert a signal 126 provided to the shunt circuitry 120, in the event that the output 113 has dropped below a predetermined threshold value. In one embodiment, the supervisor circuitry 118 asserts the respective signals 124 and 126 in the event that the output 113 drops below twenty-nine volts D.C. (wherein thirty-two volts is normal). Other threshold values can also be used.

The shunt circuitry 120 includes a switch (switching element) 128 and a resistive load 130. In one embodiment, the switch 128 is defined by a power metal-oxide semiconductor field effect transistor (P-MOSFET), while the resistive load 130 is defined by one or more resistors coupled to provide two-point-five Ohms of resistance. Other embodiments can also be used. The shunt circuitry 120 is configured to discharge the storage capacitors 108 of the drive circuitry 102 in response to an assertion of the signal 126 from the supervisor circuitry 118, or an assertion of a control signal 132 from the drive circuitry 102.

During normal operation of the printer 100, the high-voltage source 112 provides an output 113 at nominal voltage (e.g., thirty-two volts, etc.). In turn, signals 126 and 132 are non-asserted and the shunt circuitry operates in a standby condition. As such, the switch 128 is in an electrically open (i.e., substantially non-conductive) state. Additionally, the printing die(s) 104 are continuously coupled to ground potential by way of conductor 136.

When the supervisor circuitry 118 detects a sag in the output voltage 113 below a threshold level (e.g., twenty-nine volts, etc.), the signals 124 and 126 are respectively asserted. In response to signal 124, the drive circuitry 102 begins a predetermined shutdown sequence that is not germane to the present teachings. Furthermore, signal 126 causes the switch 128 to assume a closed (i.e., electrically conductive) state, electrically coupling the storage capacitors 108 (by way of conductor(s) 134) through the resistive load 130 to ground potential.

The storage capacitors 108 of the printer 100 are thus discharged in a rapid yet restricted manner. The discharge operation performed by the protective circuitry 114 prevents the firing resistors 110 from being damaged by electrical energy stored in the capacitors 108 in the event that the drive circuitry 102 loses its ability to prevent such an occurrence. After the output 113 of the high-voltage source 112 returns to its nominal operating value, the shunt circuitry 120 opens the switching element 128, the discharge operation is ended and normal operations of the printer 100 can resume.

In another operating scenario, the drive circuitry 102 detects an anomalous condition such as, for non-limiting example, an out-of-ink condition. In response, the drive circuitry 102 asserts the signal 132, which triggers the shunt circuitry 120 to discharge the capacitors 108 in essentially the same manner as described above.

The printer 100 can include other resources as desired or required that are not shown in the interest of simplicity. Non-limiting examples of such resources include other power supplies, input/output data communications circuitry, a user interface, wireless capabilities, etc. Other resources can also be included. One having ordinary skill in the printing and related arts can appreciate that the printer 100 is illustrative and that further elaboration of typical printer details is not required for an understanding of the present teachings.

Second Illustrative Embodiment

Figure 2:
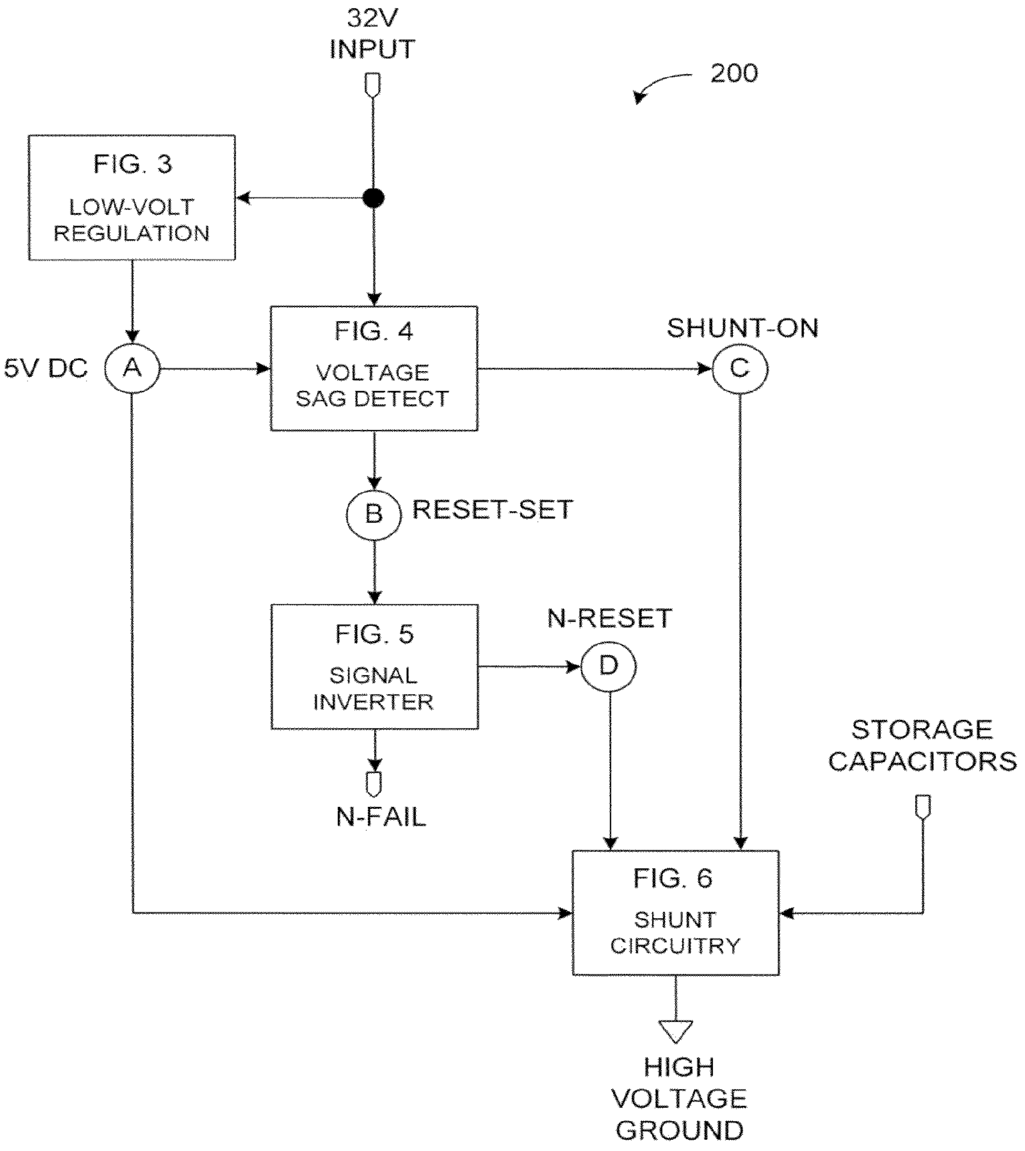
FIG. 2 depicts a block diagram of the interrelationship of FIGS. 3-6, which collectively depict protective circuitry according to an embodiment.

An embodiment of protective circuitry according to the present teachings is now described. Such protective circuitry is shown by way of FIGS. 3-6, collectively. FIG. 2 is block diagram 200 depicting the overall interrelationship of the circuitry depicted in FIGS. 3-6, inclusive. It is to be understood that other embodiments of protective circuitry can be used in accordance with the present teachings.

Figure 3:
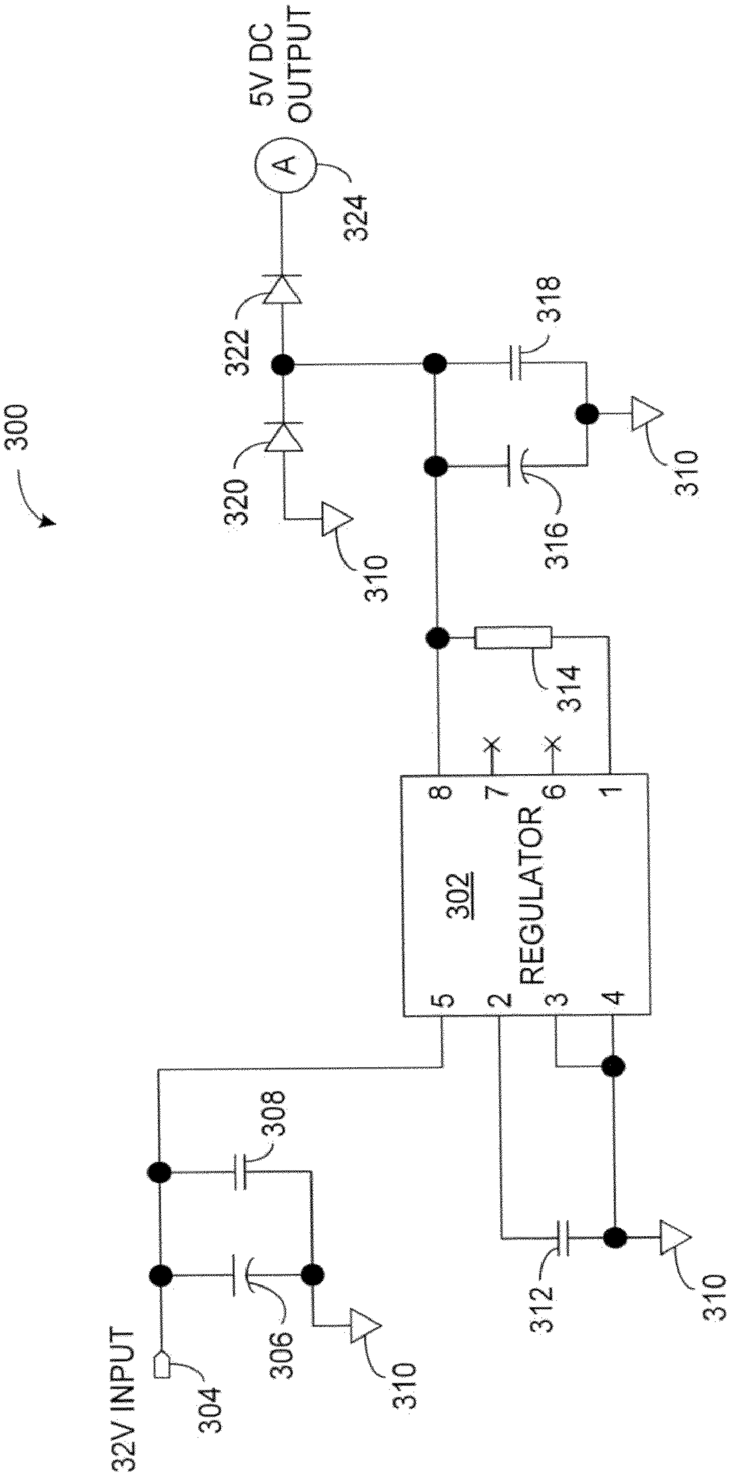
FIG. 3 depicts a schematic view of regulator circuitry of the protective circuitry according to an embodiment.

Referring now to FIG. 3, which depicts a schematic view of regulator circuitry 300. The regulator circuitry 300 includes an integrated circuit (IC) 302. The integrated circuit 302 is defined by a model LM9706BMA-5.0NOPB Low Drop-Out Regulator available from National Semiconductor Corporation, Santa Clara, Calif., USA. The integrated circuit 302 is coupled to receive thirty-two volt (nominal) power at a node 304. The incoming (or source) energy at node 304 is filtered by way of capacitors 306 and 308, which in turn are coupled to ground potential (ground) 310.

The regulator circuitry 300 further includes capacitors 312, 316 and 318, a resistor 314, and diodes 320 and 322. The regulator circuitry 300 provides a regulated five-volt D.C. output at node 324, labeled "A". Table 1 below summarizes the values of the various components depicted in regulator circuitry 300:

TABLE 1

Regulator Circuitry 300

| Element/Device | Value/Model | Notes/Vendor |
|---|---|---|
| IC 302 | LM9706BMA-5.0NOPB | Nat'l Semiconductor |
| Capacitor 306 | 22 uF | 50 V, 20% |
| Capacitor 308 | 0.1 uF | 50 V, 10% |
| Capacitor 312 | 0.1 uF | 50 V, 10% |
| Resistor 314 | 100K | 0.1 W, 1% |
| Capacitor 316 | 22 uF | 50 V, 20% |
| Capacitor 318 | 0.1 uF | 50 V, 10% |
| Diode 320 | BAV99LT1G | ON Semiconductor |
| Diode 322 | BAV99LT1G | ON Semiconductor |

Figure 4:
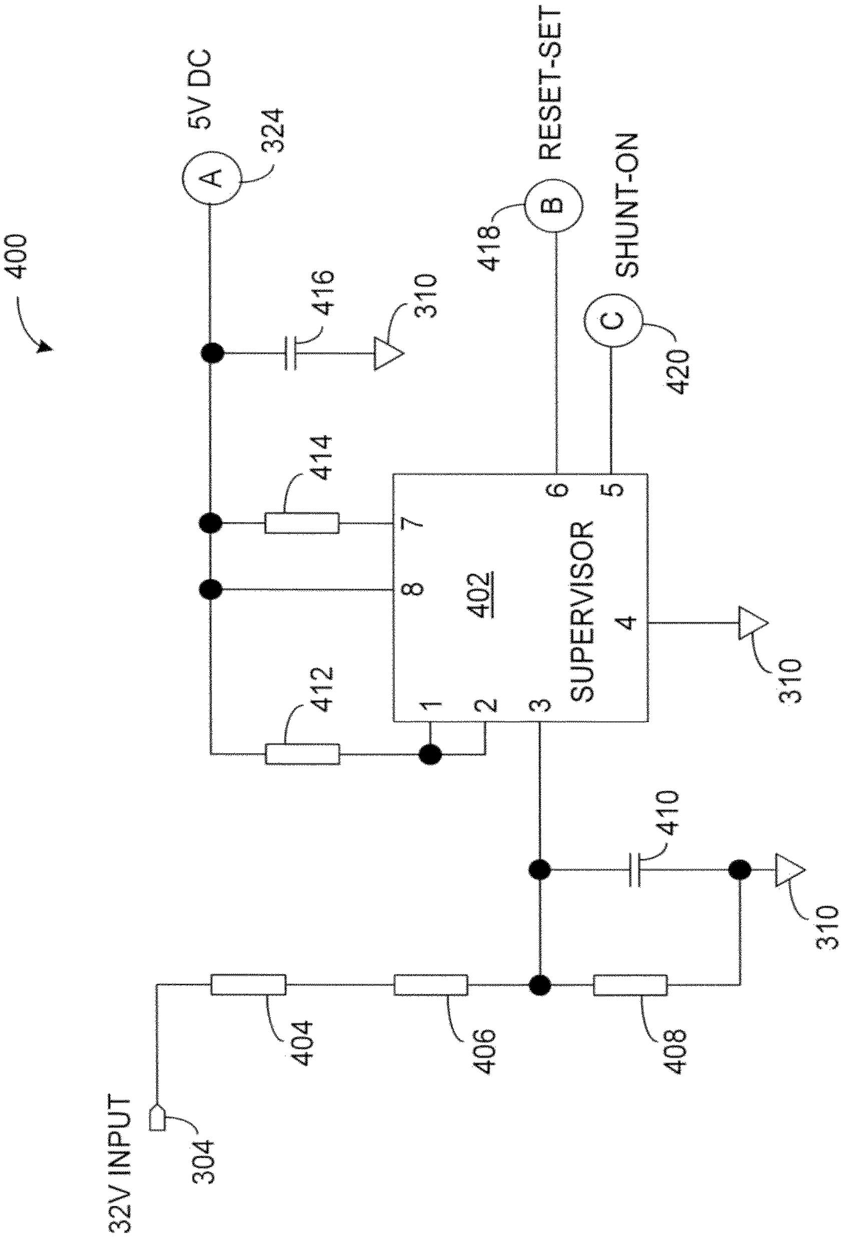
FIG. 4 depicts a schematic view of supervisor circuitry of the protective circuitry according to an embodiment.

Referring now to FIG. 4, which depicts a schematic view of supervisor circuitry 400. The supervisor circuitry 400 includes an integrated circuit (IC) 402. The integrated circuit 402 is defined by model TPS3307-25D Triple Processor Supervisor available from Texas Instruments, Dallas, Tex., USA. The integrated circuit 402 is coupled to monitor thirty-two volt (nominal) power at node 304, by way of a voltage divider defined by resistors 404-408, respectively. The integrated circuit 402 is also coupled to receive five-volt operating power from node 324 ("A") as introduced above.

The supervisor circuitry 400 provides a reset signal at node 418, labeled "B", and a shunt signal at node 420, labeled "C". The shunt ("SHUNT-ON") signal at node 420 is asserted low (toward ground potential) when the voltage monitored at node 304 drops or sags below about twenty-nine volts, and is asserted high (toward five volts) otherwise. In turn, the reset ("RESET-SET") signal at node 418 is the inverted form or logical opposite of the shunt signal at node 420.

The supervisor circuitry 400 further includes capacitors 410 and 416, and resistors 412 and 414. Table 2 below summarizes the values of the various components depicted in supervisor circuitry 400:

TABLE 2

| Supervisor Circuitry 400 | | |
|---|---|---|
| Element/Device | Value/Model | Notes/Vendor |
| IC 402 | TPS3307-25D | Texas Instruments |
| Resistor 404 | 56K | 0.1 W, 1% |
| Resistor 406 | 2K | 0.1 W, 1% |
| Resistor 408 | 3.3K | 0.1 W, 1% |
| Capacitor 410 | 0.01 uF | 50 V, 10% |
| Resistor 412 | 1K | 0.1 W, 1% |
| Resistor 414 | 10K | 0.1 W, 1% |
| Capacitor 416 | 0.1 uF | 50 V, 10% |

Figure 5:
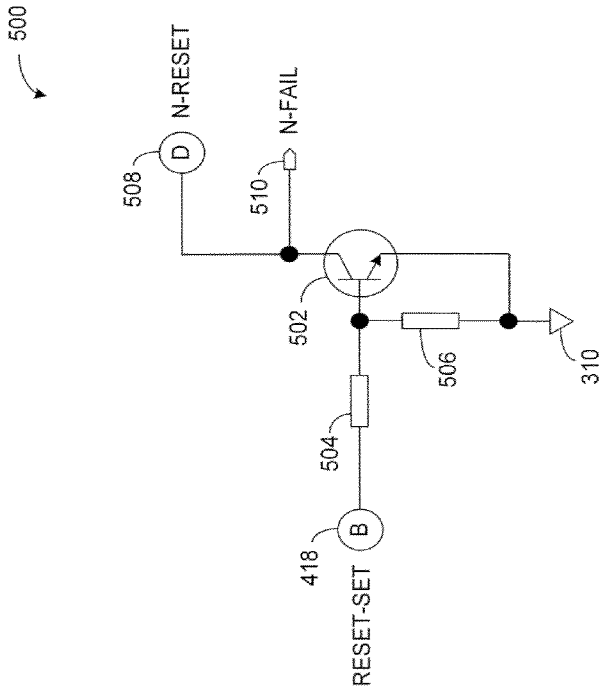
FIG. 5 depicts a schematic view of signal derivation circuitry of the protective circuitry according to an embodiment.

Referring now to FIG. 5, which depicts a schematic view of signal derivation circuitry 500. The signal derivation circuitry 500 includes a transistor 502 and respective resistors 504 and 506. The signal derivation circuitry 500 is configured to receive the reset signal ("RESET-SET") at node 418 ("B") as described above. In turn, the signal derivation circuitry 500 is configured to provide an inverted reset signal ("N-RESET") at node 508, labeled "D". Use of the inverted reset signal at node 508 is explained in further detail hereinafter. The signal derivation circuitry 500 is also configured to provide another inverted reset signal ("N-FAIL") at node 510.

The N-FAIL signal at node 510 is coupled to provide a status signal to circuitry external to the protective circuitry depicted by FIGS. 3-6. In one embodiment, the signal at node 510 is coupled to drive circuitry (e.g., 102 of FIG. 1) so as to provide an indication that a drop in high-voltage (e.g., 113 of FIG. 1) has been detected and that a storage capacitor discharge sequence will be/is being performed. Other uses for the signal at node 510 can also be made. In another embodiment, the corresponding signal at node 510 is omitted.

The signal derivation circuitry 500 is configured to provide two signals at nodes 508 and 510, respectively, which are asserted low when the RESET-SET signal at node 418 is asserted high (e.g., normal, non-discharge operation). Thus, the signal derivation circuitry 500 can also be considered as a signal inverter with dual signal outputs. Table 3 below summarizes the values of the various components depicted in signal derivation circuitry 500:

TABLE 3

| Signal Derivation Circuitry 500 | | |
|---|---|---|
| Element/Device | Value/Model | Notes/Vendor |
| Transistor 502 | MMBT4401LT1G | npn transistor |
| Resistor 504 | 10K | 0.1 W, 1% |
| Resistor 506 | 10K | 0.1 W, 1% |

Figure 6:
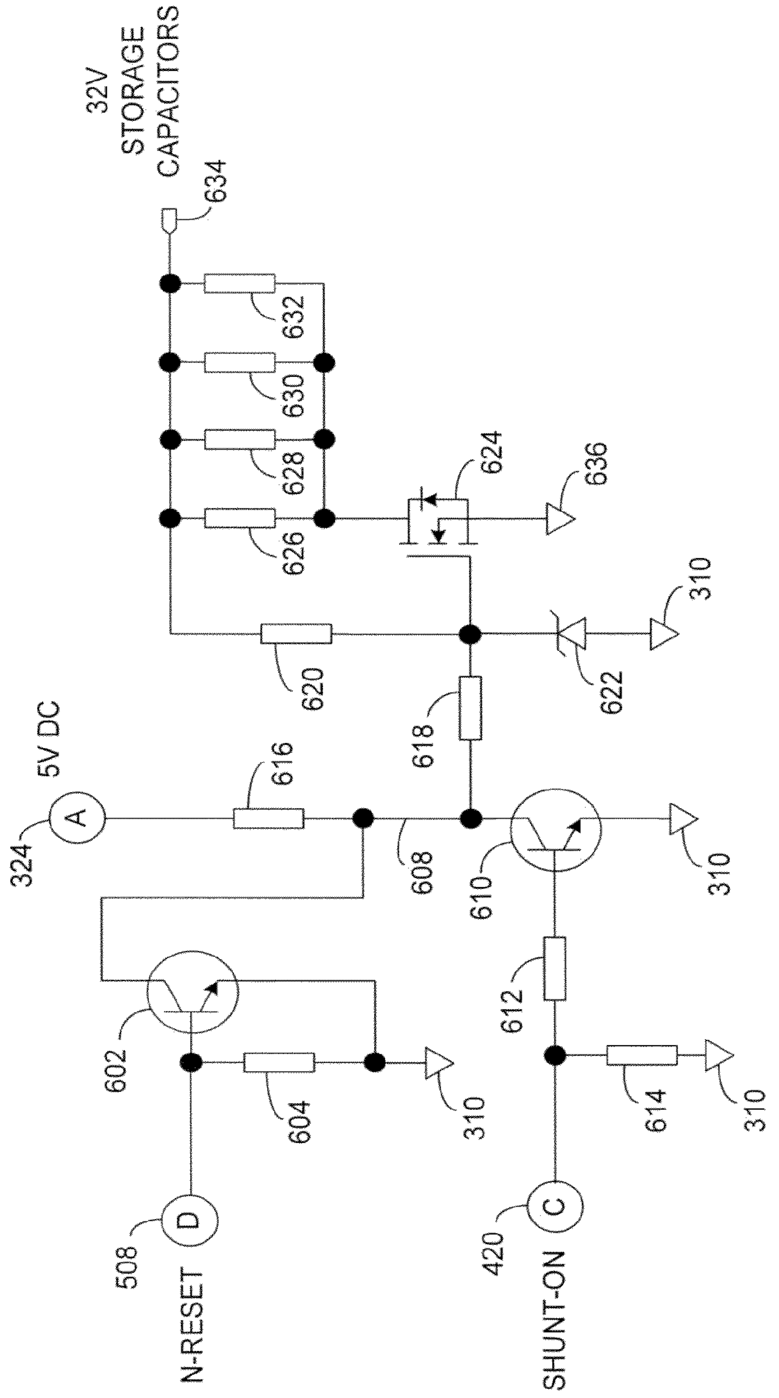
FIG. 6 depicts a schematic view of shunt circuitry of the protective circuitry according to an embodiment.

Referring now to FIG. 6, which depicts a schematic view of shunt circuitry 600. The shunt circuitry 600 is coupled to the inverted reset signal (N-RESET) at node 508 as described above. The shunt circuitry 600 includes a transistor 602 and a resistor 604 which are configured to bias or "pull" a control node 608 low when the signal at node 508 is asserted high. The shunt circuitry 600 is also coupled to the shunt signal (SHUNT-ON) at node 420 as described above. The shunt circuitry 600 includes a transistor 610, and resistors 612 and 614 which are configured to bias the control node 608 low when the signal at node 420 is asserted high. A resistor 616 is coupled to receive five-volt operating power from node 324 ("A") as introduced above. During anomalous operations, when storage capacitors (e.g., 108 of FIG. 1) are being discharged by the shunt circuitry 600, the resistor 616 serves to bias the control node 608 high.

The shunt circuitry 600 also includes resistors 618 and 620, and zener diode 622. The shunt circuitry further includes an n-channel, power metal-oxide semiconductor field effect transistor (P-MOSFET, or transistor) 624, and four resistors 626-632. The transistor 624 is configured to operate as a switch. In turn, the resistors 626-632 are coupled in parallel so as to define a resistive load of relatively low value. In one embodiment, the resistors 626-632 define a resistive load of about two-point-five Ohms value, with a power rating of four Watts. Other resistors 626-632 and their respective values can also be used. In any case, the transistor 624 and the resistors 626-634 define a controllable electric pathway, or shunt, between a node 634 and a ground potential node 636.

During typical operation, storage capacitors (e.g., 108 of FIG. 1) are electrically coupled to the node 634. When no discharge operation is needed, the transistor 624 is biased OFF, or in a substantially non-conductive state. In the event that a discharge operation is needed, the transistor 624 is biased ON, or into an electrically conductive state. Storage capacitors (e.g., 108 of FIG. 1) are then shunted to high-voltage ground 636 through the resistors 626-632 and the transistor 624. Once the discharge sequence has been performed, the transistor 624 is returned to a non-conductive state. Table 4 below summarizes the values of the various components depicted in shunt circuitry 600:

TABLE 4

| Shunt Circuitry 600 | | |
|---|---|---|
| Element/Device | Value/Model | Notes/Vendor |
| Transistor 602 | MMBT4401LT1G | npn transistor |
| Resistor 604 | 1K | 0.1 W, 1% |
| Transistor 610 | MMBT4401LT1G | npn transistor |
| Resistor 612 | 10K | 0.1 W, 1% |
| Resistor 614 | 10K | 0.1 W, 1% |
| Resistor 616 | 10K | 0.1 W, 1% |
| Resistor 618 | 1K | 0.1 W, 1% |
| Resistor 620 | 150K | 0.1 W, 1% |
| Zener Diode 622 | BZX84C12LT1G | 12 V, 0.225 W |
| Transistor 624 | NTD20N06T4G | ON Semiconductor |
| Resistor 626 | 10 Ohms | 1 W, 1% |
| Resistor 628 | 10 Ohms | 1 W, 1% |
| Resistor 630 | 10 Ohms | 1 W, 1% |
| Resistor 632 | 10 Ohms | 1 W, 1% |

Table 5 below summarizes the condition of signals and selected elements of the protective circuitry of FIGS. 3-6 during normal and discharge operating states:

TABLE 5

| Signal and Element States | | | |
|---|---|---|---|
| Signal/Element | Identity | Normal State | Discharge State |
| RESET-SET | 418 | Low | High |
| SHUNT-ON | 420 | High | Low |
| N-RESET | 508 | High | Low |
| N-FAIL | 510 | High | Low |
| Control Node | 608 | Low | High |
| Shunt Switch | 624 | Open | Closed |

First Illustrative Method

Figure 7:
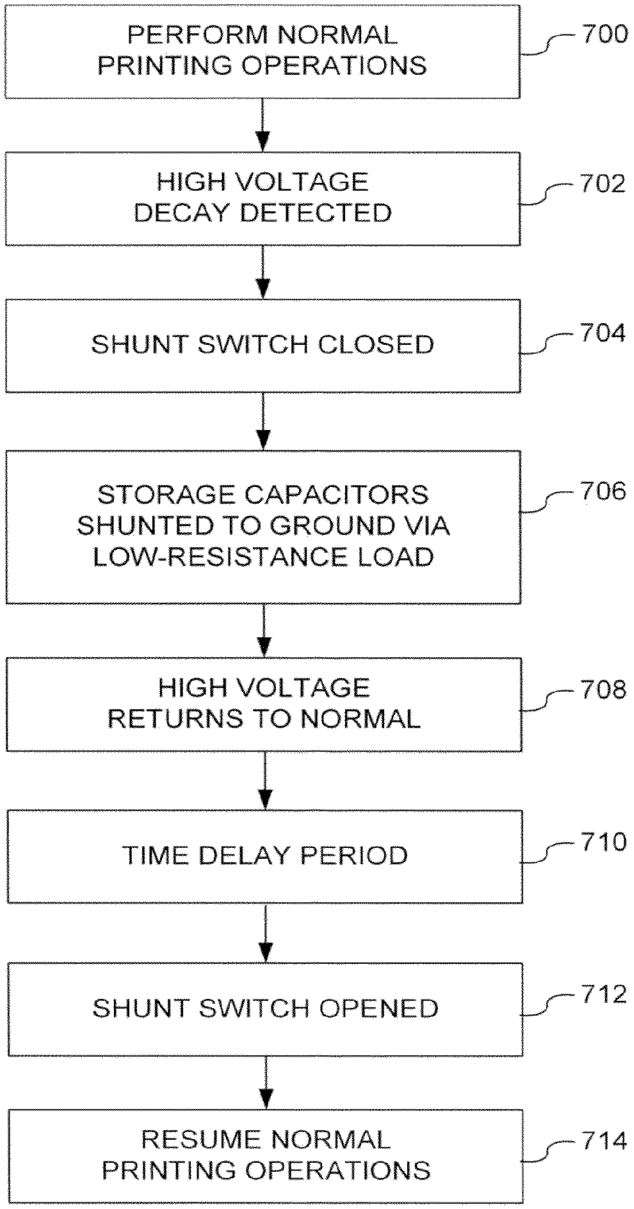
FIG. 7 depicts a flow diagram of a method according to another embodiment.

FIG. 7 is a flow diagram depicting a method according to one embodiment of the invention. The method of FIG. 7 includes particular operations and order of execution. However, other methods including other operations, omitting one or more of the depicted operations, and/or proceeding in other orders of execution can also be used according to the present teachings. Thus, the method of FIG. 7 is illustrative and non-limiting in nature.

At 700, a printer is understood to perform normal printing operations. For purposes of non-limiting example, such a printer can include the resources of printer 100 of FIG. 1.

At 702, a decay or drop in the output of a high-voltage source (i.e., power supply) is detected. Such high-voltage is understood to be used in controllably energizing firing resistors of the printer. For example, the high-voltage output 113 may be detected to drop below a predetermined threshold (e.g., twenty-nine volts, etc.) by the supervisor circuitry 118. A decay in the high-voltage 113 can disrupt the normal control operations of the drive circuitry 102, resulting in damage to the firing resistors 110.

At 704, a shunt switch is closed in order to discharge one or more high-voltage storage capacitors of the printer. For example, the switch 128 of is closed in response to the signal 126.

At 706, the one or more storage high-voltage storage capacitors are shunted to ground potential through a low-resistance electrical load. For example, the storage capacitors 108 are shunted to ground potential through the load 130 by way of the switch 128. The discharge process is understood to occur in a relatively rapid yet restricted manner, such that firing resistors 110 are preserved against damage.

At 708, the high-voltage output is detected as returning to normal. For example, the supervisor circuitry 118 may detect such a return to normal output 113 from a high-voltage source 112.

At 710, a time delay period is allowed to elapse in order to verify that the high-voltage output is stabilizing at normal output conditions. For example, the supervisor circuitry 118 can provide for a five-second delay to elapse before further signaling or a change in signaling is provided there from.

At 712, the shunt switch is opened so as to stop the high-voltage storage capacitor discharge operation. For example, the switch 128 is opened in response to a signal 126 from the supervisor circuitry 118. The storage capacitors 108 can begin charging back to normal operating levels. It is understood that such recharging of the storage capacitors is regulated by the drive circuitry 102, thus protecting the firing resistors 110 against damage.

At 714, normal printing operations are presumed. For example, the printer 100 may return to applying print to sheet media 106 by way of the printing die 104.

Second Illustrative Method

Figure 8:
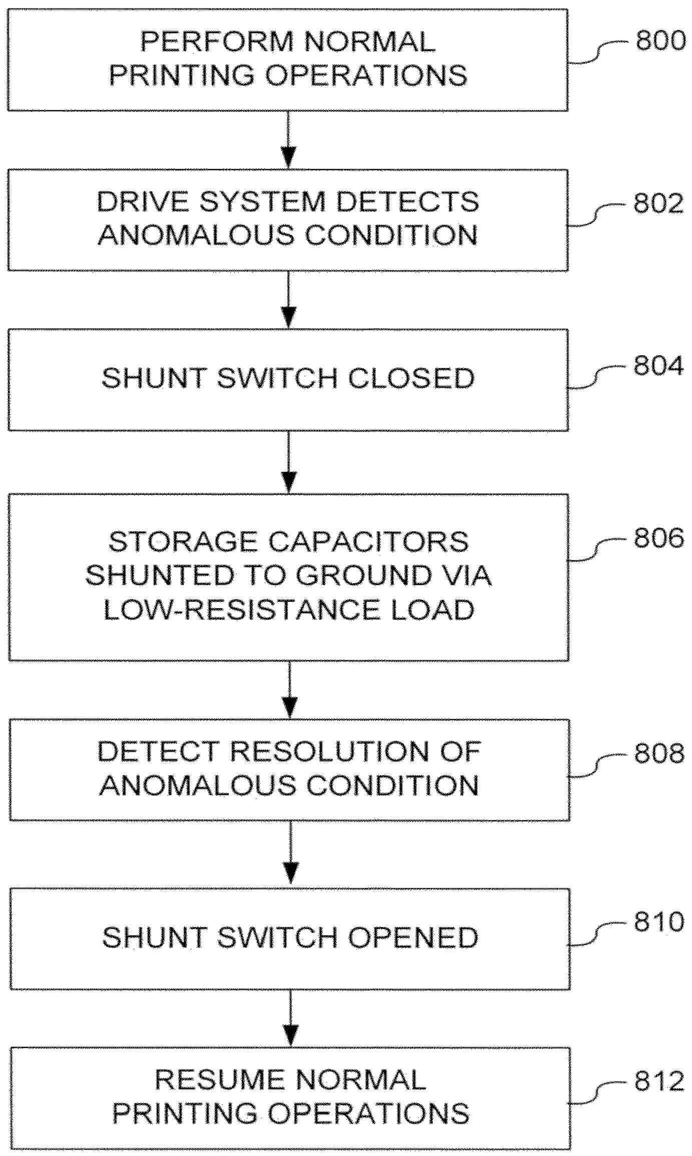
FIG. 8 depicts a flow diagram of a method according to yet another embodiment.

FIG. 8 is a flow diagram depicting a method according to one embodiment of the invention. The method of FIG. 8 includes particular operations and order of execution. However, other methods including other operations, omitting one or more of the depicted operations, and/or proceeding in other orders of execution can also be used according to the present teachings. Thus, the method of FIG. 8 is illustrative and non-limiting in nature.

At 800, a printer is understood to perform normal printing operations. For purposes of non-limiting example, such a printer can include the resources of printer 100 of FIG. 1.

At 802, drive circuitry of the printer detects an anomalous condition that will or may jeopardize the firing resistors of the one or more printing dies of the printer. For example, the drive circuitry may detect an out-of-ink condition. Other anomalous conditions can also be detected. For purposes of illustration, it is assumed that the drive circuitry 102 detects an out-of-ink condition that may adversely affect the firing resistors 110.

At 804, a shunt switch is closed in order to discharge one or more high-voltage storage capacitors of the printer. For example, the switch 128 of is closed in response to the signal 132 issued by the drive circuitry 102.

At 806, the one or more storage high-voltage storage capacitors are shunted to ground potential through a low-resistance electrical load. For example, the storage capacitors 108 are shunted to ground potential through the load 130 by way of the switch 128. The discharge process is understood to occur in a relatively rapid yet restricted manner, such that the firing resistors 110 of the printer 100 are preserved against damage.

At 808, the anomalous condition is detected as being resolved and is no longer a concern. For example, the drive circuitry 102 may detect replenishment of the low or depleted ink resource that serves the printing die(s) 104.

At 810, the shunt switch is opened so as to stop the high-voltage storage capacitor discharge operation. For example, the switch 128 is opened in response to a corresponding signal 132 from the drive circuitry 102. The storage capacitors 108 can begin charging back to normal operating levels. It is understood that such recharging of the storage capacitors is regulated by the drive circuitry 102, thus protecting the firing resistors 110 against damage.

At 812, normal printing operations are presumed. For example, the printer 100 may return to applying print to sheet media 106 by way of the printing die(s) 104.

The foregoing method is illustrative of any number of methods contemplated by the present teachings, wherein a signal can be issued by drive (i.e., control) circuitry so as initiate a storage device discharge sequence. As in the method of FIG. 7, the method of FIG. 8 is directed to preserving the firing resistors of an inkjet printing device against damage that can result from the uncontrolled application of high-voltage electrical power. Numerous other methods consistent with the operations and/or objectives of the method of FIGS. 7 and 8 can also be used according to the present teachings.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:

supervisor circuitry configured to monitor a voltage and assert a signal responsive to a drop in the voltage below a threshold; and shunt circuitry configured to electrically discharge one or more energy storage devices through a resistive load in response to an assertion of the signal, the one or more energy storage devices configured to buffer electrical energy controllably provided to one or more ink jetting devices within an inkjet printer.

2. The apparatus according to claim 1, the shunt circuitry including the resistive load of less than about three ohms in value.

3. The apparatus according to claim 1, the shunt circuitry including a switching element operative in accordance with the signal.

4. The apparatus according to claim 1 further comprising regulator circuitry configured to provide regulated electrical energy to the supervisor circuitry and the shunt circuitry.

5. The apparatus according to claim 4, the regulator circuitry further configured to provide the regulated electrical energy to the supervisor circuitry and the shunt circuitry while the voltage exceeds a minimum value that is less than the threshold.

6. A printing apparatus, comprising:

at least one ink jetting device;

drive circuitry configured to control operation of the at least one ink jetting device, the drive circuitry including one or more energy storage devices;

protective circuitry coupled to the drive circuitry, the protective circuitry configured to electrically discharge the one or more energy storage devices in response to a drop in a monitored voltage below a threshold such that the at least one ink jetting device is preserved against damage caused by electrical energy stored in the one or more energy storage devices.

7. The printing apparatus according to claim 6, the protective circuitry further configured to provide a signal to the drive circuitry in response to a drop in the monitored voltage below the threshold.

8. The printing apparatus according to claim 6, the protective circuitry including a switching element and a resistive load, the one or more energy storage devices being shunted to a ground potential by way of the switching element and the resistive load in response to a drop in the monitored voltage below the threshold.

9. The printing apparatus according to claim 6, the protective circuitry including a regulator coupled to the monitored voltage, the regulator configured to provide regulated operating power to the protective circuitry while the monitored voltage exceeds a minimum value that is less than the threshold.

10. The printing apparatus according to claim 6, the protective circuitry further configured to electrically discharge the one or more energy storage devices in response to a signal provided by the drive circuitry.

11. A method, comprising:

detecting a drop in a monitored voltage below a threshold, the monitored voltage used to drive one or more ink jetting devices of a printer device;

discharging one or more energy storage devices in response to the detecting the drop in the monitored voltage below the threshold; and preserving the one or more ink letting devices against damage in accordance with the discharging.

12. The method according to claim 11, the discharging the one or more energy storage devices performed using a switching device and a resistive load.

* * * * *

UNITED STATES PATENT AND TRADEMARK OFFICE

CERTIFICATE OF CORRECTION

PATENT NO. : 8,194,376 B2
APPLICATION NO. : 12/400167
DATED : June 5, 2012
INVENTOR(S) : Octavio Salazar It is certified that error appears in the above-identified patent and that said Letters Patent is hereby corrected as shown below:

In column 10, line 19, in Claim 11, delete “letting” and insert -- jetting --, therefor.

Signed and Sealed this
Eighth Day of January, 2013

David J. Kappos
*Director of the United States Patent and Trademark Office*